United States Patent [19]
Mitchell et al.

[11] 3,799,475
[45] Mar. 26, 1974

[54] AIRFLOW CONTROL SYSTEM FOR SUPERSONIC INLETS

[75] Inventors: Glenn A. Mitchell, Berea; Bobby W. Sanders, Brookpark, both of Ohio

[73] Assignee: The United States of America as represented by the Administrator of the National Aeronautics and Space Administration, Washington, D.C.

[22] Filed: June 11, 1971

[21] Appl. No.: 152,328

[52] U.S. Cl. ............... 244/53 B, 137/15.1, 137/15.2
[51] Int. Cl. ............................................. B64d 33/02
[58] Field of Search ........ 244/53 R, 53 B; 137/15.1, 137/15.2, 511, 514.5, 514.7

[56] References Cited
UNITED STATES PATENTS
2,755,040  7/1956  Pinkos et al. ...................... 244/53 B
3,007,481  11/1961  Frost ................................. 137/116
3,067,578  12/1962  Goodall et al. ...................... 60/35.6
3,126,174  3/1964  Zetterstrom et al. ............. 244/53 B
3,495,605  2/1970  Gunnarson et al. ............... 137/15.1

Primary Examiner—Duane A. Reger
Assistant Examiner—Barry L. Kelmachter
Attorney, Agent, or Firm—N. T. Musial; J. A. Mackin; J. R. Manning

[57] ABSTRACT

In addition to fixed and variable bleed devices provided for controlling the position of a terminal shock wave in a supersonic inlet, a plurality of free piston valves are disposed around the periphery of a cowling of a supersonic engine inlet. The free piston valves are disposed in dump passageways, each of which begins at a bleed port in the cowling that is located in the throat region of the inlet where the diameter of the centerbody is near maximum and terminates at an opening in the cowling adjacent a free piston valve. Each valve is controlled by a reference pressure.

12 Claims, 2 Drawing Figures

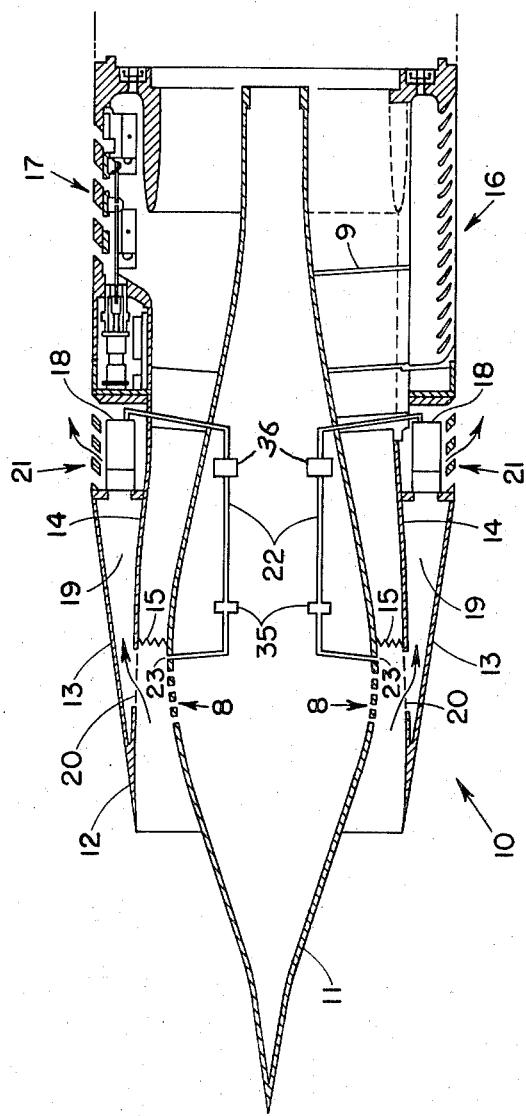

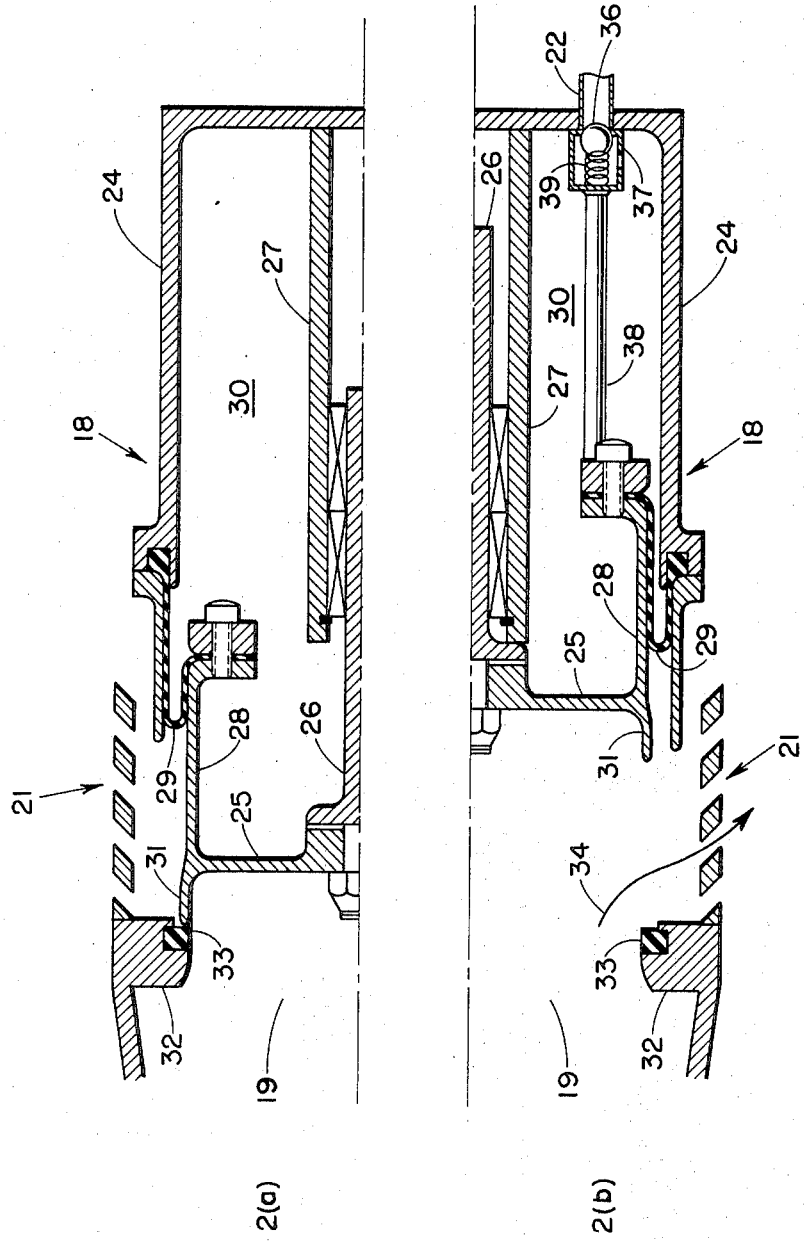

AIRFLOW CONTROL SYSTEM FOR SUPERSONIC INLETS

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

The invention relates to air inlets for supersonic aircraft engines and is directed more particularly to shock wave controlling apparatus adapted to prevent the terminal shock wave from being expelled out the front of the air inlet under certain operational conditions such as a reduction in the amount of required diffuser airflow or the occurrence of gusts. Such expulsion of the terminal shock wave can result in a complete loss of thrust and can actually result in a drag component. This obviously cannot be tolerated for an aircraft.

In the prior art, a number of bleed systems have been utilized in attempts to prevent expulsion of the terminal shock wave out of the air inlet. One of these methods involves the use of fixed openings or bleeds communicating with the space between the cowling and the centerbody. Such arrangements are satisfactory only in a very limited operating range. To increase the stable operating range with a fixed throat bleed exit the performance level of the inlet must be reduced to undesirably low levels.

A type of controllable bleed arrangement involves an apertured plate disposed at the outer surface of the cowling and a movable plate which may be moved axially to open or close the apertures. A shock position sensor connected to a computer control is used to hydraulically control the position of the movable plate thereby determining the amount of air bled from the interior of the cowl and permitted to escape. Such arrangements are not self-acting and involve expensive computer operated hydraulic or pneumatic controls. Although the controllable type air bleed provides a much larger steady state stable operating range than the fixed type air bleed, its ability to control transient air flow changes is nevertheless not as great as required for conditions encountered in supersonic flight.

SUMMARY OF THE INVENTION

It is an object of the invention to provide a new and novel controllable air bleed system for the inlet of a supersonic aircraft engine.

It is another object of the invention to provide a controllable supersonic inlet bleed system that provides the inlet with a relatively large stable operating range.

Still another object of the invention is to provide a controllable bleed system which is relatively simple and inexpensive.

Yet another object of the invention is to provide a controllable air bleed system which is responsive to a substantially constant bleed pressure characteristic control device.

An additional object of the invention is to provide a controllable air bleed system for supersonic inlets wherein massive amounts of air flow may be bypassed from the throat of a supersonic inlet.

DESCRIPTION OF THE DRAWINGS

FIG. 1 is a longitudinal cross-sectional view of an axisymmetric supersonic air inlet embodying the invention.

FIG. 2 comprises two quarter axial sectional views of a free piston valve embodied in the invention, FIG. 2a showing the valve in closed position and FIG. 2b showing the valve in opened position.

DESCRIPTION OF A PREFERRED EMBODIMENT

Referring now to FIG. 1, there is shown a supersonic air inlet 10 including a centerbody 11 disposed in an annular cowling 12. The cowling is formed by annular inner wall 14 and an outer wall 13.

The desired position for the terminal shock wave as shown at 15 is at or near the throat of the air inlet where the diameter of the centerbody 11 is near maximum. If gusts or other conditions cause the shock wave 15 to move ahead of the throat area, the shock wave may be expelled from the front of the air inlet causing an unstart condition. To inhibit or prevent the shock wave 15 from being expelled, air bleeds 8 are provided in the throat region on the centerbody 11 and are ducted through hollow centerbody support struts 9 to fixed air bleed exits in the cowling as at 16 and a variable air bleed system as provided in the cowling as at 17. The variable air bleed system 17 may be of the guillotine type as shown. As explained previously, neither the fixed bleeds 8, the fixed cowling bleeds of the prior art, nor the variable bleed 17 may have sufficient range of operation to prevent the terminal shock wave 15 from being expelled under certain adverse conditions.

To the end that massive amounts of air may be dumped from the interior of the air inlet through the cowling 12, one or more free piston valves 18 are disposed around the periphery of the cowling 12. The free piston valves 18 are disposed at openings of an air passageway 19 which provides communication between bleed ports 20 and gates 21.

The bleed ports 20 may take the form of a single annular slot or a perforated annular wall section. Similarly, the air passageway 19 may be an annular plenum or a plurality of air passageways, each terminating at a respective valve 18.

Reference pressure for the free piston valves 18 is provided through conduits 22 which are connected between the valves 18 and reference ports 23 disposed around the periphery of the centerbody 11 just forward of the normal position of shock wave 15 as shown. With shock wave 15 in its normal position, that is just to the rear of reference ports 23, the pressure communicated through conduits 22 to valves 18 is slightly higher than the pressure in passageway 19. Consequently, the valves 18 are normally closed.

When gusts or adverse conditions cause the shock wave 15 to move forward from the throat area, the air pressure at the bleed ports 20 increases. This pressure increase is communicated through the passageway 19 to the valves 18 causing the free piston valves 18 to open. Opening of the valves 18 allows massive amounts of air to enter bleed ports 20 passing through air passageway 19 past the valves 18 and out through the gates 21. This prevents the shock wave 15 from being expelled out the front of the air inlet and, when the gusts or unstable condition terminates the valves 18 will again close. An isolator 35 in the conduit 22 insulates the pressure in valves 18 from external changes during the operation of the valve. Isolator 35 may take the form of a restrictor or a pneumatic capacitor. A pressure regulator 36 may be disposed in each of the conduits 22 and may be of a commercially available type having a constant pressure inlet communicating with a reference port 23.

Referring now to FIG. 2a, there is shown a free piston valve 18 comprising a cylindrical cup 24 and a piston 25 which is provided with a post 26 extending into a guide 27 of the cup 24. The piston 25 includes an annular skirt portion 28 which slidably engages the cup 24 when the piston 25 moves axially rearward. A rolling seal such as flexible member 29 may be disposed between the skirt of the piston and the cup 24 when the piston is of substantially smaller diameter than the cup 24. The piston 25 with the cup 24 and the rolling seal 29 form a chamber 30, the volume of which is variable in accordance with the difference of pressure between that communicated to the chamber 30 from a reference port 23 as shown in FIG. 1 and the pressure present in passageway 19.

The piston 25 is also provided with an axially extending annular rim 31 which engages an air passageway rim 32 at the outward end of the passageway 19 when the valve 18 is closed. An annular ring 33 of a suitable resilient material may be disposed on the rim 32 to improve the sealing engagement of the rim 31 with the rim 32.

Referring now to FIG. 2b there is shown a valve 18 in open position, that is with the skirt 28 of the piston 25 pushed into the cup 24. As indicated previously, this occurs when the pressure in air passageway 19 exceeds the pressure in the chamber 30. As shown in FIG. 2b, the annular rim 31 is separated from the resilient ring 33 allowing a massive amount of air to pass from the passageway 19 out through the gate 21 as indicated by the arrow 34. This prevents the shock wave 15 shown in FIG. 1 from being expelled out the front of the air intake.

A ball valve 36 retained in a cage 37 which is supported by a rod 38 extending from piston 25 closes the opening of conduit 22 at its point of entrance to the chamber 30 when the valve 18 is opened.

A spring 39 disposed in the cage presses the ball 36 against the opening of conduit 22 as the piston 25 approaches its opened or retracted position. The ball valve 36 serves the same function as the isolator 35 of FIG. 1 and may be used in conjunction with or in place of the isolator 35.

The rolling seal 29 of the valve 18 as shown in FIGS. 2a and 2b should be sufficiently soft as to provide substantially zero spring constant for the valve 18. On the other hand, it should have sufficient stiffness to dampen oscillations which may occur under certain conditions. The rolling seal 29 may be eliminated by making the piston 28 of sufficient diameter to slidingly engage the cup 24. With this arrangement friction between the piston skirt 28 and the cup 24 will provide damping to inhibit oscillations of the piston.

ALTERNATE EMBODIMENTS

The structure described above may be utilized to minimize local pressure increases in a supersonic air inlet as may occur due to the reflected shock wave or due to a change in the angle of attack. The only change necessary to accomplish this is moving the bleed ports 20 and the reference ports 23 to positions well forward of their respective locations for controlling the terminal shock. Additionally this arrangement can be used simultaneously with the arrangement for controlling the terminal shock wave.

It will be understood the above-described invention may be changed or modified without departing from the spirit and scope of the invention as set forth in the claims appended hereto.

What is claimed is:

1. A supersonic inlet for a jet aircraft engine comprising:
   an annular cowling having an outer wall and an inner wall forming an air passageway;
   a centerbody disposed in said cowling and forming a throat with said inner wall, said inner wall having bleed ports therein forward of said throat, said air passageway being provided with an end wall having openings into dump gates;
   a free piston valve disposed at each dump gate for opening and closing each of said dump gates;
   a reference pressure source connected in controlling relationship to said free piston valves to control the opening and closing thereof; and
   a resilient ring disposed around said openings into said dump gate to provide seats for said free piston valves.

2. A supersonic inlet for a jet aircraft engine comprising:
   an annular cowling having an outer wall and an inner wall forming an air passageway;
   a centerbody disposed in said cowling and forming a throat with said inner wall, said inner wall having bleed ports therein forward of said throat, said air passageway being provided with an end wall having openings into dump gates;
   a free piston valve disposed at each dump gate for opening and closing each of said dump gates;
   said free piston valve comprising a cup and piston slidably disposed therein to form a variable volume chamber, said chamber communicating with a reference pressure source, said piston engaging said opening into said dump gate to close same when said reference pressure is greater than the pressure at said air bleed port; and
   a reference pressure source connected in controlling relationship to said free piston valves to control the opening and closing thereof.

3. The structure of claim 2 wherein said bleed ports comprise an annular slot.

4. The structure of claim 2 wherein each dump gate includes an outer grill comprising vanes each disposed at an angle such as to direct air from said openings rearward.

5. The structure of claim 2 wherein said reference source comprises a conduit connected between each free piston valve and a respective reference port in said centerbody, said reference port being axially positioned between said bleed ports and the normal position of the terminal shock wave.

6. The structure of claim 2 and including a spring-loaded, piston-actuated check valve in said chamber.

7. The structure of claim 2 and further including pressure regulator means interposed between said reference pressure source and said free piston valves to regulate the pressure supplied to said valves whereby said valves open when the terminal shock wave moves forward to said bleed ports.

8. The apparatus of claim 2 wherein said piston is of substantially smaller diameter than said cup and including a rolling seal disposed between said piston and said cup.

9. The structure of claim 8 and including a spring-loaded, piston-actuated check valve in said chamber.

10. The structure of claim 2 and including isolator means connected between said reference pressure source and each free piston valve to inhibit closing of said valve when the terminal shock is upstream of its normal position.

11. The structure of claim 10 and including a pneumatic capacitor connected between said reference pressure source and each free piston valve.

12. The structure of claim 10 and including a restrictor connected between said reference pressure source and each of said free piston valves.

* * * * *